United States Patent
Yamashita et al.

(10) Patent No.: US 10,429,508 B2
(45) Date of Patent: Oct. 1, 2019

(54) DISTANCE MEASURING DEVICE, MOVING SYSTEM, AND DISTANCE MEASUREMENT METHOD

(71) Applicant: RICOH COMPANY, LTD., Tokyo (JP)

(72) Inventors: Tetsuo Yamashita, Tokyo (JP); Satoshi Sawaguchi, Kanagawa (JP); Fumiko Sakoh, Kanagawa (JP); Soichiro Yokota, Kanagawa (JP); Kiichiroh Saitoh, Kanagawa (JP); Tadashi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 381 days.

(21) Appl. No.: 15/333,415

(22) Filed: Oct. 25, 2016

(65) Prior Publication Data

US 2017/0123063 A1 May 4, 2017

(30) Foreign Application Priority Data

Oct. 30, 2015 (JP) ................................ 2015-214931
Sep. 20, 2016 (JP) ................................ 2016-182857

(51) Int. Cl.
*G01C 3/08* (2006.01)
*G01S 17/02* (2006.01)
(Continued)

(52) U.S. Cl.
CPC ............ *G01S 17/023* (2013.01); *G01C 3/085* (2013.01); *G01S 17/08* (2013.01); *G01S 17/93* (2013.01)

(58) Field of Classification Search
CPC ........ G01S 17/023; G01S 17/08; G01S 17/93; G01C 3/085
(Continued)

(56) References Cited

U.S. PATENT DOCUMENTS 6,999,896 B2 * 2/2006 Takahashi ............. G01S 7/4026
342/450
9,866,819 B2 * 1/2018 Suzuki .................... B60R 11/04
(Continued)

FOREIGN PATENT DOCUMENTS

JP       2006-031101    2/2006
JP       5589324        9/2014
(Continued)

*Primary Examiner* — Mark Hellner
(74) *Attorney, Agent, or Firm* — Xsensus LLP

(57) ABSTRACT

A distance measuring device includes a first measurer, a second distance measurer, and circuitry. The first distance measurer measures a distance to a target object; and outputs first distance information indicating a measured distance when the distance measurement is performed under a condition that satisfies a distance measurement condition, but outputs the first distance information indicating a predetermined value when the distance measurement is performed under a condition that does not satisfy the distance measurement condition. The second distance measurer measures a distance to the target object and outputs second distance information indicating the measured distance. When the first distance information indicates the predetermined value and the second distance information satisfies a predetermined condition, the circuitry makes alteration such that the distance measurement condition is relaxed. When the distance measurement condition is altered, the first distance measurer measures a distance to the target object again.

13 Claims, 14 Drawing Sheets

(51) Int. Cl.
*G01S 17/08* (2006.01)
*G01S 17/93* (2006.01)
(58) Field of Classification Search
USPC .......................................................... 356/5.01
See application file for complete search history.

(56) References Cited

U.S. PATENT DOCUMENTS

2006/0210113 A1* 9/2006 Fujioka ................. G01S 13/931
382/104
2016/0299219 A1 10/2016 Suzuki et al.
2018/0293740 A1* 10/2018 Murray ................... G01S 17/89

FOREIGN PATENT DOCUMENTS

| JP | 2015-179077 | 10/2015 |
| JP | 2015-179078 | 10/2015 |
| WO | WO 2015/098469 A1 | 7/2015 |

\* cited by examiner

DISTANCE MEASURING DEVICE, MOVING SYSTEM, AND DISTANCE MEASUREMENT METHOD

CROSS-REFERENCE TO RELATED APPLICATIONS

The present application claims priority under 35 U.S.C. § 119 to Japanese Patent Application No. 2015-214931, filed on Oct. 30, 2015 and Japanese Patent Application No. 2016-182857, filed on Sep. 20, 2016. The contents of which are incorporated herein by reference in their entirety.

BACKGROUND OF THE INVENTION

1. Field of the Invention

The present invention relates to a distance measuring device, a moving system, and a distance measurement method.

2. Description of the Related Art

Conventionally, it has been known that a distance measuring device that includes a plurality of distance measuring units such as a stereo camera and a laser distance measuring device and a technology for measuring the distance to a target object by using the distance measurement results of those distance measuring units are known (for example, Japanese Unexamined Patent Application Publication No. 2006-031101).

In the above-described distance measuring units in the conventional technology, however, there may be a distance measurement condition being imposed in order to secure the reliability of distance measurement. In this case, unless otherwise the distance measurement is made under a condition that satisfies the distance measurement condition, an actually measured distance is not obtained. Thus, in the above-described conventional technology, the situation that the distance measurement can be performed by the distance measuring device is restricted.

SUMMARY OF THE INVENTION

According to one aspect of the present invention, a distance measuring device includes a first distance measurer, a second distance measurer, and circuitry. The first distance measurer measures a distance to a target object; and outputs first distance information indicating a measured distance when the distance measurement is performed under a condition that satisfies a distance measurement condition, but outputs the first distance information indicating a predetermined value when the distance measurement is performed under a condition that does not satisfy the distance measurement condition. The second distance measurer measures a distance to the target object and outputs second distance information indicating the measured distance. When the first distance information indicates the predetermined value and the second distance information satisfies a predetermined condition, the circuitry makes alteration such that the distance measurement condition is relaxed. When the distance measurement condition is altered, the first distance measurer measures a distance to the target object again.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
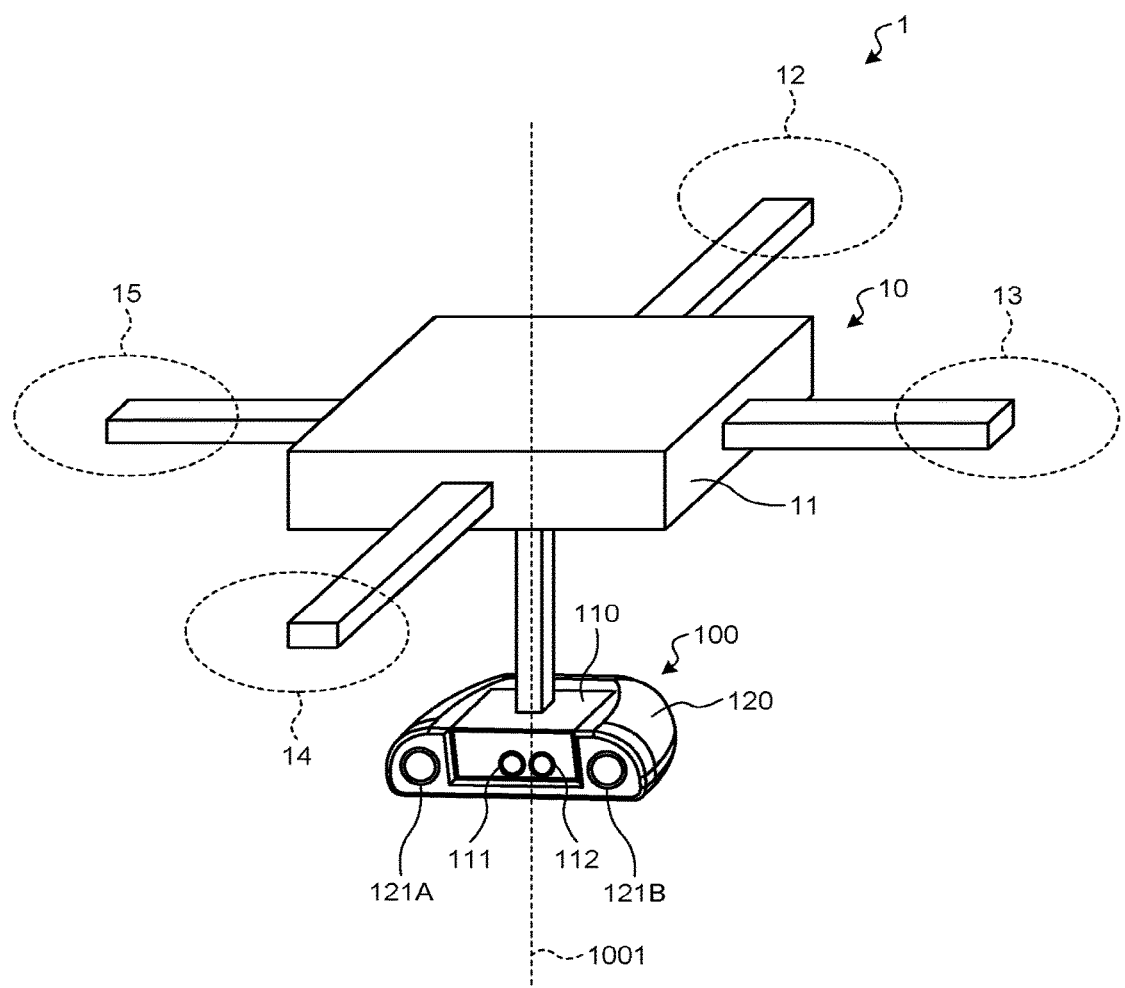
FIG. 1 is a schematic diagram illustrating one example of a moving system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a distance measuring device, a moving system, and a distance measurement method that can extend the situation in which the distance measurement is possible.

A moving system in the invention includes a distance measuring device and a moving object.

Examples of the moving object include an airplane, a robot, an automobile, and a marine vessel, for example, but the moving object is not limited to these. The moving object may be a moving object that autonomously moves, may be a moving object that a person maneuvers or operates, or may be a moving object that a person remotely maneuvers or remotely operates by using a remote controller. The moving object may be one that a person can board or ride, or may be one that a person cannot board or ride.

The distance measuring device is installed in the moving object and, by measuring the distance to an object (target object) present in the periphery of the moving object, aids the movement of the moving object. The distance measuring device may be installed on the outside of the moving object or may be installed in the inside thereof.

For example, if the moving object is a moving object that moves autonomously, the distance measuring device measures the distance to an object (target object) present in the periphery of the moving object to estimate the self-location of the moving object, and can control the autonomous locomotion based on the self-location estimated result of the distance measuring device. Accordingly, the moving object can autonomously move while avoiding an obstacle and others.

Furthermore, for example, if the moving object is an automobile, the distance measuring device measures the distance to an object (target object) present in the moving direction of the automobile to detect an obstacle and others that is present on the course of the automobile, and can inform a driver of the obstacle and others detected by the distance measuring device by using a display and a speaker provided on the automobile. Accordingly, the driver can drive the automobile so as to avoid the obstacle and others or stop just before the obstacle and others.

In the present embodiment, exemplified is a moving system that the moving object is an unmanned aircraft (for example, a drone and an unmanned aerial vehicle (UAV)) that makes autonomous flight, and that the distance measuring device estimates the self-location of the moving object and, the moving object controls the autonomous locomotion based on the self-location estimated result. However, the embodiment is not limited thereto.

FIG. 1 is a schematic diagram illustrating one example of a moving system 1 according to the embodiment. As illustrated in FIG. 1, the moving system 1 includes a moving object 10 and a distance measuring device 100.

As illustrated in FIG. 1, the moving object 10 includes a fuselage 11, and propellers 12 to 15 that are provided in the front and back and on the right and left of the fuselage 11. The moving object 10 drives the propellers 12 to 15 to rotate so as to fly.

In a lower portion of the fuselage 11, the distance measuring device 100 is provided. In the embodiment, to keep the balance of the moving object 10 while flying, the distance measuring device 100 is provided in the lower portion of the fuselage 11 such that the central axis of the moving object 10 and the central axis of the distance measuring device 100 are to be an identical axis 1001.

Figure 2:
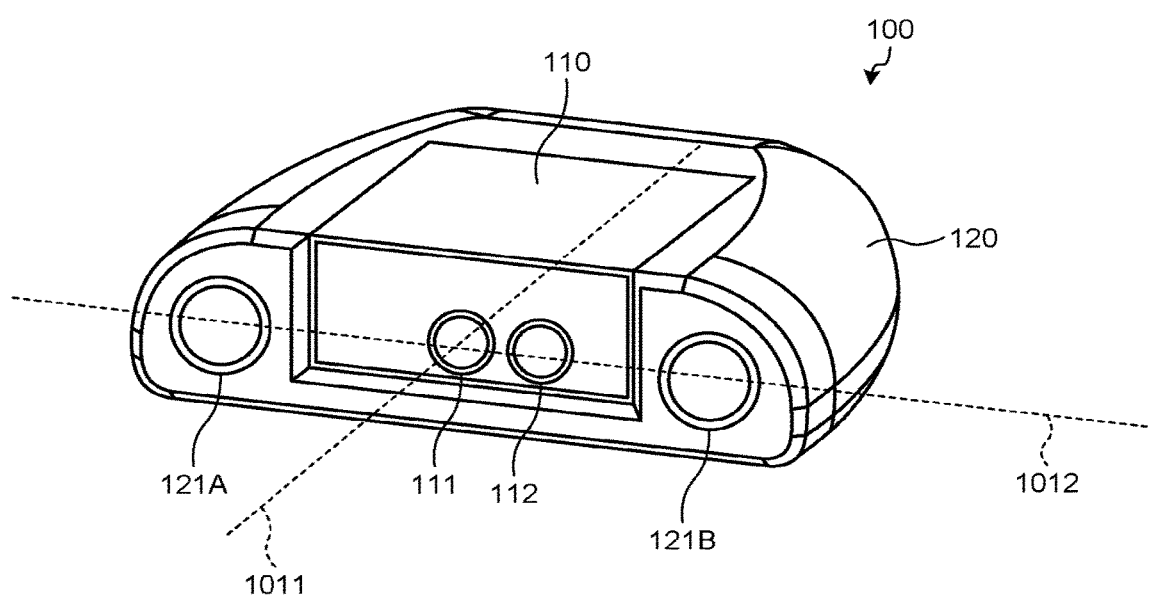
FIG. 2 is a perspective view illustrating one example of a distance measuring device in the embodiment.
Figure 3:
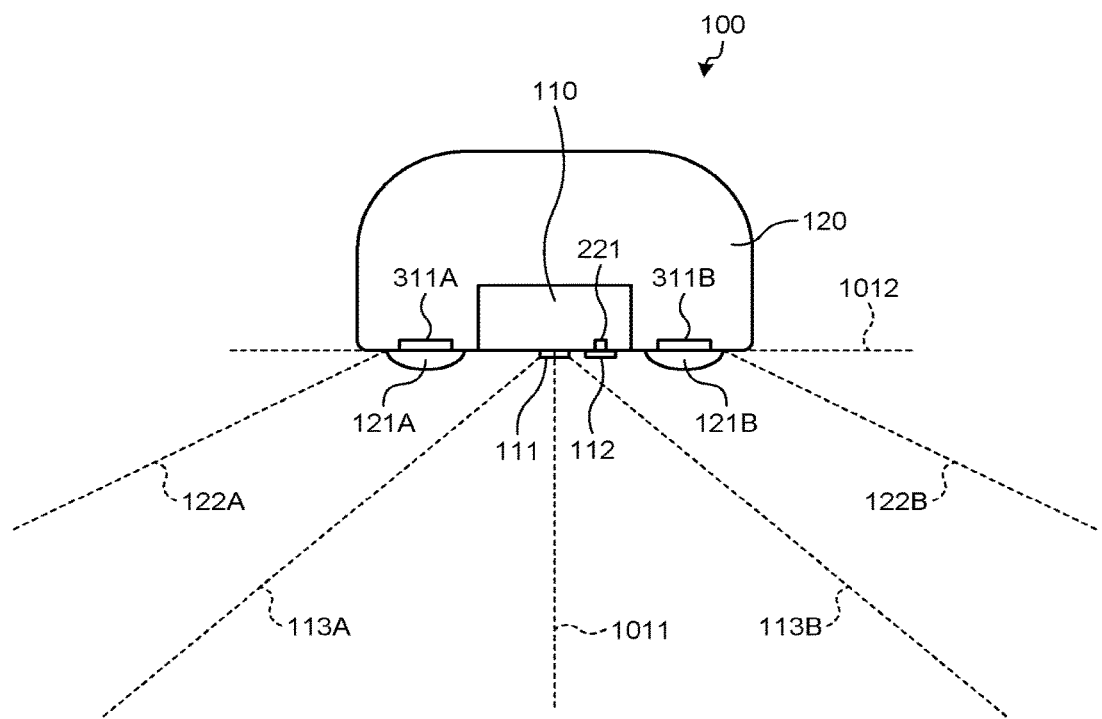
FIG. 3 is a plan view illustrating one example of the distance measuring device in the embodiment.

FIG. 2 is a perspective view illustrating one example of the distance measuring device 100 in the embodiment, and FIG. 3 is a plan view illustrating one example of the distance measuring device 100 in the embodiment. As illustrated in FIGS. 1 to 3, the distance measuring device 100 includes a housing 120, and an attachment 110 that is attachable (removable) to the housing 120.

In the embodiment, the housing 120 has a groove formed in a central portion on the front face thereof, and is structured such that, by fitting the attachment 110 in the groove, the attachment 110 is attached to the central portion on the front face of the housing 120. In this way, in the embodiment, the distance measuring device 100 is exemplified that includes the housing 120 and the attachment 110 as separate components. However, the distance measuring device may be structured with the housing 120 and the attachment 110 being integrally combined.

In the embodiment, it is assumed that the attachment 110 has a built-in laser distance measuring device that measures distance based on an electromagnetic wave, and that the housing 120 has a built-in stereo camera that measures distance based on imaging. However, the embodiment is not limited thereto.

The laser distance measuring device, in detail, measures distance based on a time difference between a laser beam that is emitted from an output optical system 111 and the reflected light of the laser beam that is received by a light-receiving optical system 112. In the embodiment, exemplified is the laser distance measuring device that measures distance in a scanning method that optically scans a measuring area with a laser beam and obtains distance information from the light-receiving time of the reflected light and from the phase difference thereof. However, the distance measurement may be performed in a non-scanning method that irradiates the entire measuring area with laser light, images the reflected light, and obtains the distance information from the phase difference in received light for each pixel.

The stereo camera, in detail, measures distance by parallax calculation using a captured image that is imaged by an imaging optical system 121A and by a complementary metal oxide semiconductor (CMOS) 311A that is an imaging element for the imaging optical system 121A and a captured image that is imaged by an imaging optical system 121B and by a CMOS 311B that is an imaging element for the imaging optical system 121B.

In the embodiment, the measurement in three-dimensional space is possible by the distance measurement with the laser distance measuring device, and in the same manner, the measurement in three-dimensional space is possible by the distance measurement with the stereo camera. In the embodiment, however, the coordinate axes of the three-dimensional space in which the distance is measured by the laser distance measuring device and the coordinate axes of the three-dimensional space in which the distance is measured by the stereo camera are made to match. Thus, in the embodiment, the distance measuring device 100 is designed such that the reference axis of the laser distance measuring device and the reference axis of the stereo camera are an identical axis 1011 and such that the light receiving surface of the laser distance measuring device and the imaging surface of the stereo camera are located on an identical axis 1012.

The reference axis of the laser distance measuring device in a scanning method is a central axis in the irradiation range of the laser beam (in the example illustrated in FIG. 3, the range from a straight line 113A up to a straight line 113B), and examples thereof include an optical axis of the output optical system 111, for example. In the reference axis of the laser distance measuring device, the axis only needs to be set such that the coordinate axes of distance information output by the laser distance measuring device and the coordinate axes of the distance information output by the stereo camera match up, and it is not limited to the above-described example. This also applies to a non-scanning method. The reference axis of the stereo camera is a central axis in the imaging range of the stereo camera (in the example illustrated in FIG. 3, the range from a straight line 122A up to a straight line 122B), and examples thereof include a central axis of the stereo camera, for example. Examples of the central axis of the stereo camera include an axis located in the center between the optical axis of the imaging optical system 121A and the optical axis of the imaging optical system 121B, for example.

Examples of the light receiving surface of the laser distance measuring device include a light receiving element 221 for the light-receiving optical system 112, for example. Examples of the imaging surface of the stereo camera include the CMOS 311A that is the imaging element for the imaging optical system 121A and the CMOS 311B that is the imaging element for the imaging optical system 121B, for example.

Thus, in the embodiment, the imaging optical system 121A and the imaging optical system 121B are arranged on both ends of the housing 120 and the output optical system 111 is arranged on the attachment 110, such that the reference axis of the laser distance measuring device and the reference axis of the stereo camera are the identical axis 1011 when the attachment 110 is attached to the housing 120.

In the same manner, in the embodiment, the CMOS 311A and the CMOS 311B are arranged on both ends of the housing 120 and the light receiving element 221 is arranged on the attachment 110, such that the light receiving surface of the laser distance measuring device and the imaging surfaces of the stereo camera are located on the identical axis 1012 when the attachment 110 is attached to the housing 120.

Figure 4:
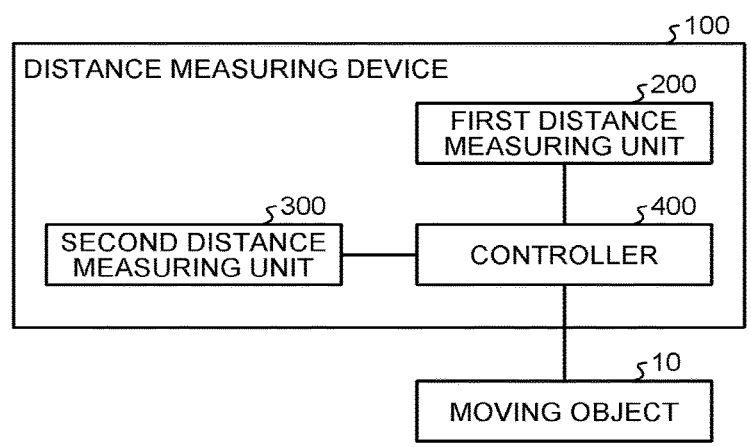
FIG. 4 is a block diagram illustrating one example of a configuration of the moving system in the embodiment.

FIG. 4 is a block diagram illustrating one example of the configuration of the moving system 1 in the embodiment. As illustrated in FIG. 4, the distance measuring device 100 includes a first distance measuring unit (a first distance measurer) 200, a second distance measuring unit (a second distance measurer) 300, and a controller 400. The first distance measuring unit 200 relates to the distance measurement by the laser distance measuring device, the second distance measuring unit 300 relates to the distance measurement by the stereo camera, and the controller 400 relates to the control of the first distance measuring unit 200 and the second distance measuring unit 300 and concerning the communication with moving object 10.

Figure 5:
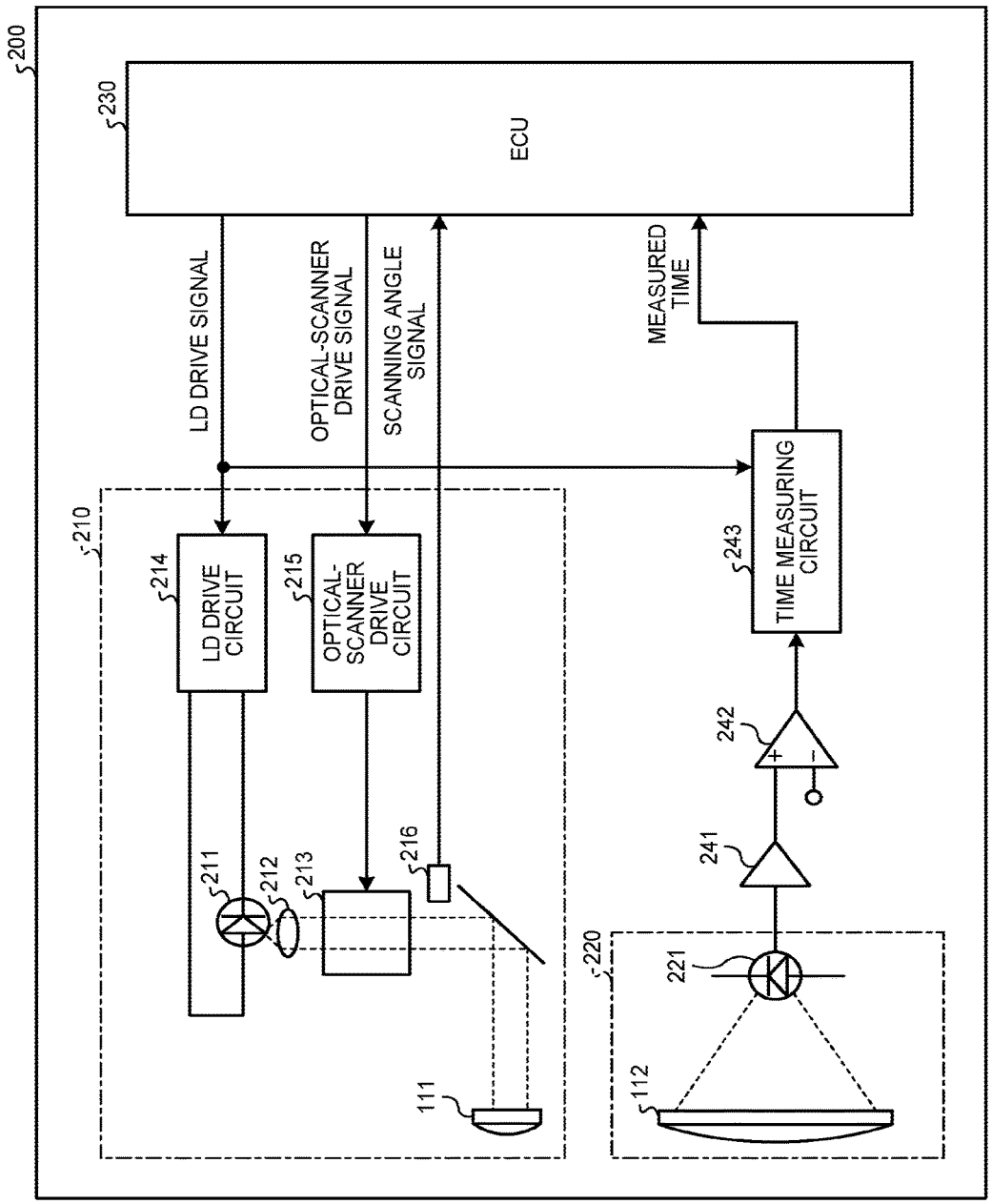
FIG. 5 is a block diagram illustrating one example of a hardware configuration of a first distance measuring unit in the embodiment.

FIG. 5 is a block diagram illustrating one example of the hardware configuration of the first distance measuring unit 200 in the embodiment. The first distance measuring unit 200 emits a laser beam while varying the irradiation direction in the up-and-down direction and the left-and-right direction and receives the reflected light that is the laser beam reflected by the object, so as to detect the distance to an object.

The first distance measuring unit 200 includes a light transmitting unit 210, a light receiving unit 220, an engine control unit (ECU) 230, and others.

The light transmitting unit 210 includes a laser diode (semiconductor laser diode (LD)) 211 that emits a pulsed laser beam, an optical scanner 212, an input optical system 213 that leads the light from the LD 211 into the optical scanner 212, the output optical system 111 that controls the irradiation angle of the laser beam that passed through the optical scanner 212, and others.

The LD 211 is coupled to the ECU 230 via an LD drive circuit 214, and emits a laser beam regularly or continuously by an LD drive signal from the ECU 230. The LD drive signal is also input to a time measuring circuit 243. As for the laser beam, a semiconductor laser is mainly used. However, any principle of light emission such as a solid-state laser, a gas laser, a dye laser, and others may be used. The laser beam is one type of electromagnetic wave that has a good directivity and convergence.

The optical scanner 212 is coupled to the ECU 230 via an optical-scanner drive circuit 215 and repeatedly scans the laser beam, which is emitted from the LD 211 at a predetermined fixed frequency, in the horizontal direction. Examples of the optical scanner 212 include a polygon mirror, a galvanometer mirror, a digital mirror device (DMD), and others, for example, but the optical scanner 212 is not limited to these.

The scanning angle of the laser beam in the optical scanner 212 is detected by a scanning angle monitor 216 and is output to the ECU 230. The ECU 230, by feeding back the scanning angle of the laser beam to the optical-scanner drive signal, controls the scanning angle (orientation and gradient) and a scanning frequency.

The light receiving unit 220 includes the light-receiving optical system 112, the light receiving element 221, and others. The reflected light that is reflected from an object is incident on the light receiving element 221 via the light-receiving optical system 112 and others. The light receiving element 221 is formed with a photodiode and the like, and outputs an electrical signal of a voltage value corresponding to the light intensity of the reflected light. The electrical signal output from the light receiving element 221 is amplified by an amplifier 241 and is output to a comparator 242.

The comparator 242 compares the value of the output voltage from the amplifier 241 with a reference voltage V0 and, when the value of the output voltage is greater than V0, outputs a predetermined light receiving signal to the time measuring circuit 243.

The time measuring circuit 243 outputs to the ECU 230 the time it takes until the light receiving signal is generated after the LD drive signal is output, that is, the time difference between the time the laser beam was emitted and the time the reflected light was received. The ECU 230 calculates, based on this time difference, the distance to the object.

Figure 6:
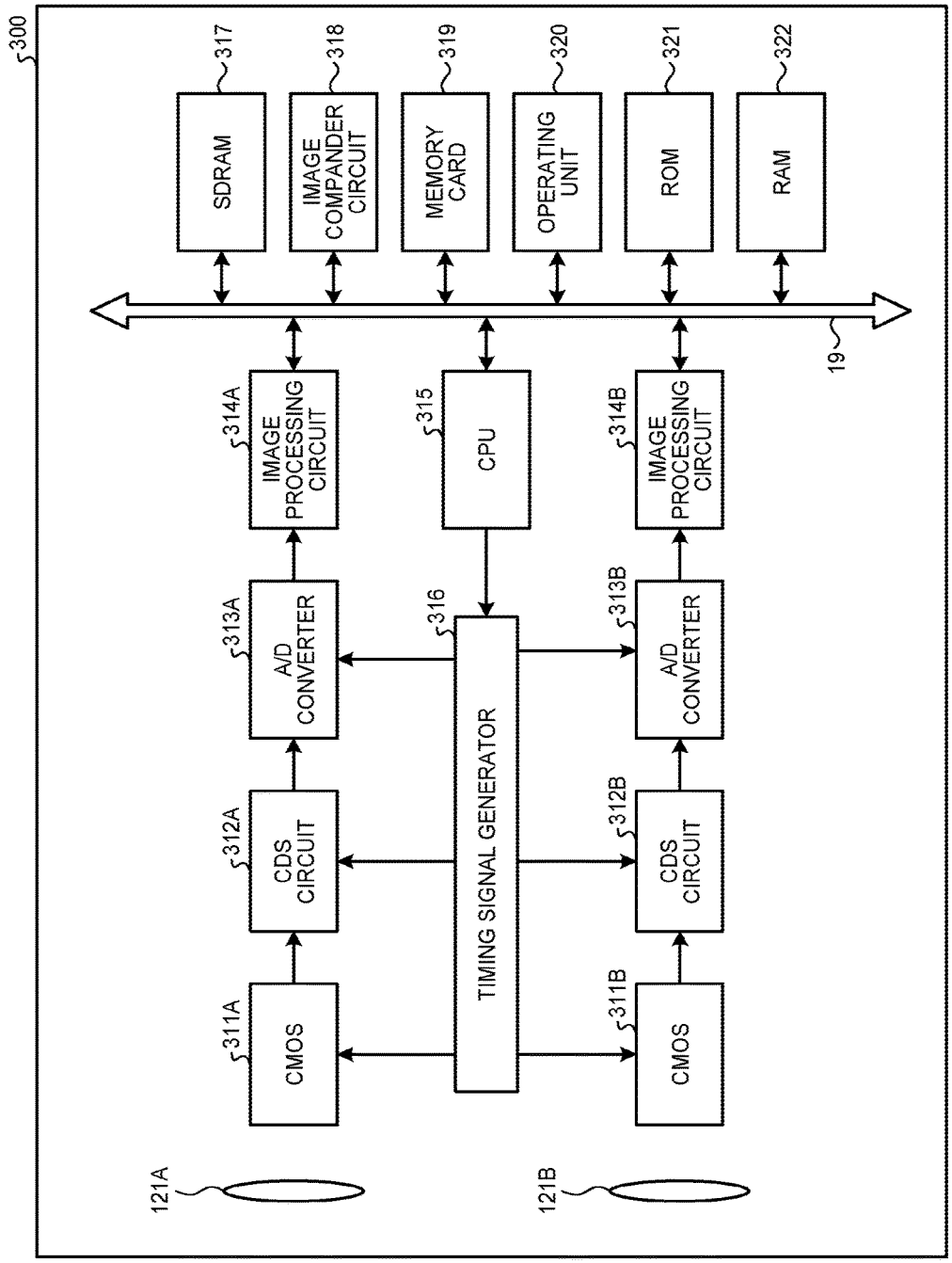
FIG. 6 is a block diagram illustrating one example of a hardware configuration of a second distance measuring unit in the embodiment.

FIG. 6 is a block diagram illustrating one example of the hardware configuration of the second distance measuring unit 300 in the embodiment. The light of a subject that passed through the imaging optical system 121A forms an image on the CMOS 311A, and the light of the subject that passed through the imaging optical system 121B forms an image on the CMOS 311B. The CMOS 311A converts the optical image formed on the imaging surface into an electrical signal and outputs it as analog image data, and the CMOS 311B converts the optical image formed on the imaging surface into an electrical signal and outputs it as analog image data. As the imaging element, in place of the CMOS 311A and the CMOS 311B, a charge coupled device (CCD) may be employed.

The image data output from the CMOS 311A is converted into a digital value by an A/D converter 313A after having a noise component removed by a correlated double sampling (CDS) circuit 312A, and is output to an image processing circuit 314A. The image data output from the CMOS 311B is converted into a digital value by an A/D converter 313B after having a noise component removed by a CDS circuit 312B, and is output to an image processing circuit 314B.

The timing of operation of the CMOSs 311A and 311B, the CDS circuits 312A and 312B, and the A/D converters 313A and 313B is controlled by a timing signal generator 316.

The image processing circuits 314A and 314B each perform a variety of image processing such as RGB-to-YCrCb conversion processing, white-balance control processing, contrast correction processing, edge enhancement processing, and color conversion processing, by using a synchronous dynamic random-access memory (SDRAM) 317 that temporarily stores therein the image data. The white-balance control processing is the image processing that adjusts color density in image information, the contrast correction processing is the image processing that adjusts the contrast in the image information, the edge enhancement processing is the image processing that adjusts the sharpness in the image information, and the color conversion processing is the image processing that adjusts the hue in the image information. Each of the image data on which a variety of image processing is performed by the image processing circuit 314A and the image data on which a variety of image processing is performed by the image processing circuit 314B is a color image.

The image data on which the image processing is performed and stored in the SDRAM 317 is compressed by an image compander circuit 318 and is recorded in a memory card 319. The image compander circuit 318 is the circuit that compresses the image data output from each of the image processing circuits 314A and 314B and outputs it to the memory card 319, and that expands the image data read out from the memory card 319 and outputs it to the image processing circuits 314A and 314B.

The timing signal generator 316, the image processing circuits 314A and 314B, the image compander circuit 318, and the memory card 319 are controlled by a central processing unit (CPU) 315. A read only memory (ROM) 321 is a read only memory that stores therein programs executed by the CPU 315, and a random access memory (RAM) 322 is a readable and writable memory that has a work area that the CPU 315 uses in the course of a variety of processing and has various data storage areas.

The CPU 315 generates a parallax image by performing parallax calculation using stereo images, that is, the image data on which a variety of image processing has been performed by the image processing circuit 314A and the image data on which a variety of image processing has been performed by the image processing circuit 314B, and based on the generated parallax image, the CPU 315 obtains the distance to an object shown in the parallax image. For example, the CPU 315 converts stereo images into luminance images (Y images) and, based on the converted luminance images, generates a parallax image. The parallax is calculated for each pixel or each pixel block, and in the parallax image, each pixel or each pixel block is associated with parallax information. The pixel block is a block composed of one or more pixels. Thus, the parallax image can represent a three-dimensional location (three-dimensional coordinates) of the object (target object) that appears in the parallax image on the three-dimensional space. The parallax image generation may be implemented by not the CPU 315 but a circuit dedicated for parallax image generation that is implemented with a field-programmable gate array (FPGA) and others.

The primary constituents of the second distance measuring unit 300 are connected to one another via a bus line 19.

Figure 7:
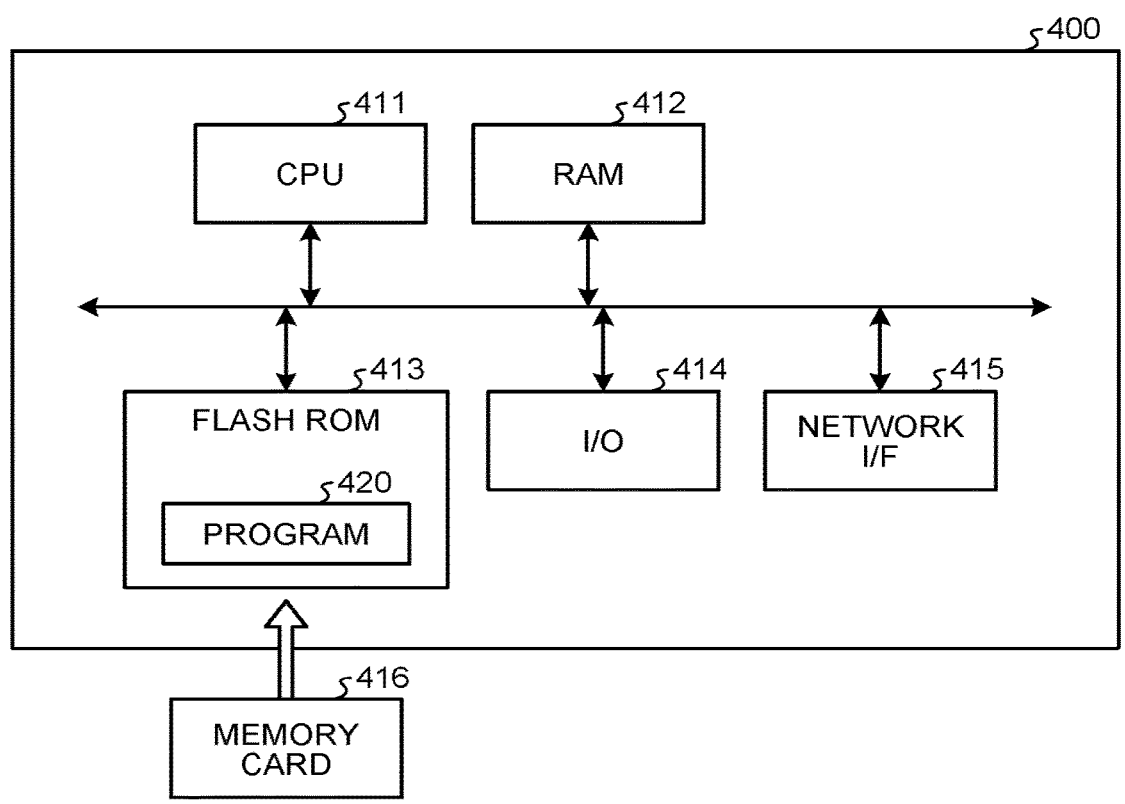
FIG. 7 is a block diagram illustrating one example of a hardware configuration of a controller in the embodiment.

FIG. 7 is a block diagram illustrating one example of the hardware configuration of the controller 400 in the embodiment. The controller 400 includes a CPU 411, a RAM 412, a flash ROM 413, an I/O 414, and a network I/F 415.

The CPU 411 executes a program 420 stored in the flash ROM 413 and controls the operation of a whole of the controller 400. The program 420 may be distributed in a state of being stored in a memory card 416, or may be distributed by being downloaded from a server via a communication network such as a mobile telephone network and a wireless local area network (LAN). The RAM 412 is used as a work area (in which programs and data are temporarily stored) when the CPU 411 executes the programs.

The CPU 411 performs, based on the distance measurement result of the first distance measuring unit 200 and the distance measurement result of the second distance measuring unit 300, self-location estimation and makes the first distance measuring unit 200 measure distance again.

The I/O 414 is an input and output interface such as I2C and UART. The network I/F 415 is a communication device to perform communication on an in-vehicle network such as Ethernet (registered trademark).

Figure 8:
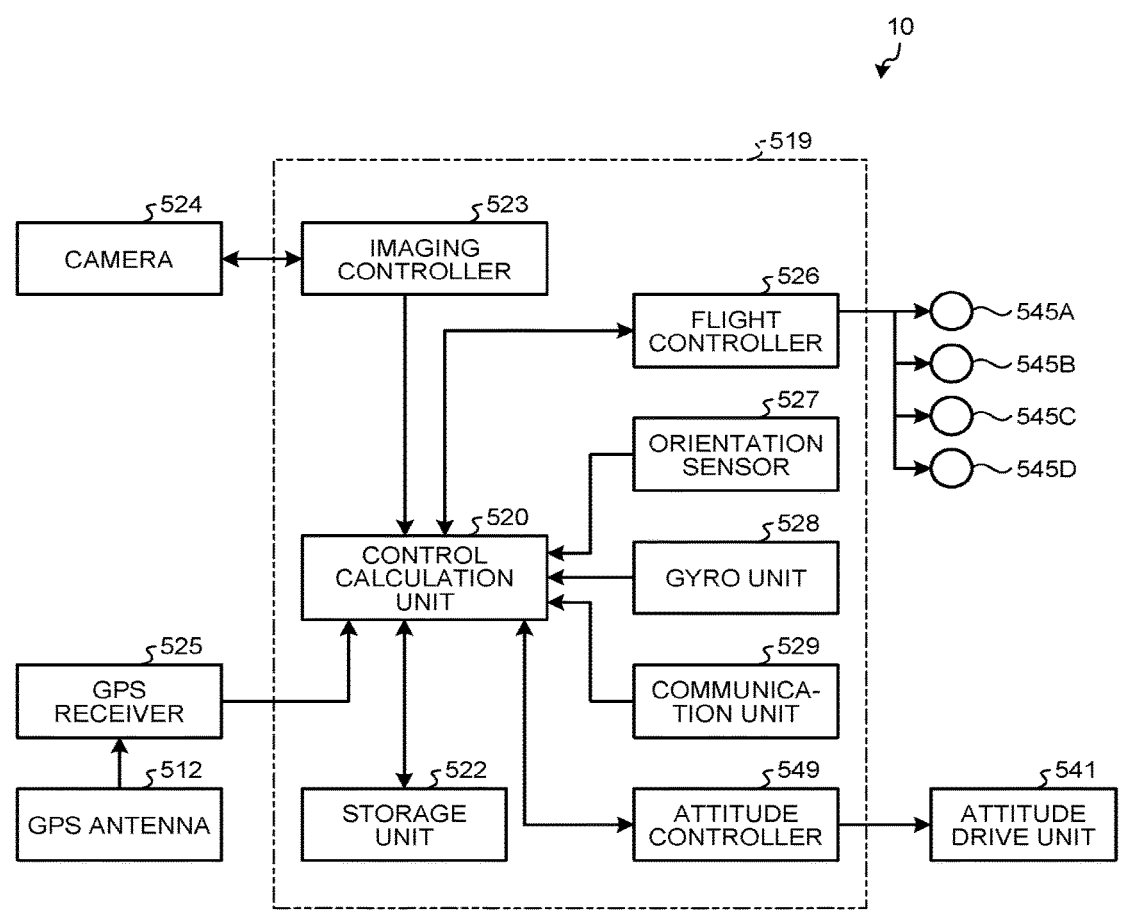
FIG. 8 is a block diagram illustrating one example of a hardware configuration of a moving object in the embodiment.

FIG. 8 is a block diagram illustrating one example of the hardware configuration of the moving object 10 in the embodiment. The moving object 10 mainly includes a camera 524, a control device 519, a GPS antenna 512, a GPS receiver 525, propeller motors 545A to 545D, and an attitude drive unit 541.

The camera 524 has a CCD or a CMOS sensor as an imaging element, is capable of imaging a still image and a moving image, and is capable of outputting the obtained image as image data of a digital signal.

The GPS antenna 512 and the GPS receiver 525 measure the absolute coordinates of the moving object 10. As for the GPS antenna 512 and the GPS receiver 525, it is preferable that post-processing kinematic GPS or real-time kinematic GPS (RTK-GPS) be used. In the RTK-GPS, highly accurate measurement is possible.

The propeller motors 545A to 545D are motors to drive the propellers 12 to 15 to rotate, respectively.

The control device 519 primarily includes a control calculation unit 520, a storage unit 522, an imaging controller 523, a flight controller 526, an orientation sensor 527, a gyro unit 528, a communication unit 529, and an attitude controller 549.

The storage unit 522 is a RAM and a ROM, for example, and includes a program storage portion and a data storage portion. In the program storage portion, stored are programs such as an imaging program for controlling the imaging of the camera 524, a flight control program for performing autonomous flight, an attitude control program for controlling the attitude of the camera 524, a flight plan program, and others. In the data storage portion, stored is data such as imaging data that the camera 524 imaged, the absolute coordinates (ground coordinates) acquired by the GPS antenna 512, the GPS receiver 525, and others.

The control calculation unit 520 controls, based on the programs stored in the storage unit 522, the operation of a whole of the moving object 10.

The imaging controller 523 performs control concerning the imaging of a still image and a moving image by the camera 524. The orientation sensor 527 detects the orientation of the moving object 10. The gyro unit 528 detects the attitude of the moving object 10 in a state of flight. The flight controller 526 controls the drive of the propeller motors 545A to 545D based on the self-location estimated by the controller 400 of the distance measuring device 100, the orientation of the moving object 10 detected by the orientation sensor 527, the attitude of the moving object 10 detected by the gyro unit 528, and others, so as to control autonomous flight of the moving object 10. The flight controller 526 may control the autonomous flight of the moving object 10 by using, in place of the self-location estimated by the controller 400 of the distance measuring device 100, the absolute coordinates acquired by the GPS antenna 512 and the GPS receiver 525. The attitude controller 549 drives the attitude drive unit 541 to control the attitude of the camera 524.

The communication unit 529 has functions of performing communication with the distance measuring device 100 and acquiring the self-location information (self-location estimated result) indicating the self-location estimated by the distance measuring device 100, and of transmitting to a base station in a wireless manner the imaging data that is imaged with the camera 524 and the absolute coordinates of the moving object 10 that are measured by the GPS antenna 512 and the GPS receiver 525.

Figure 9:
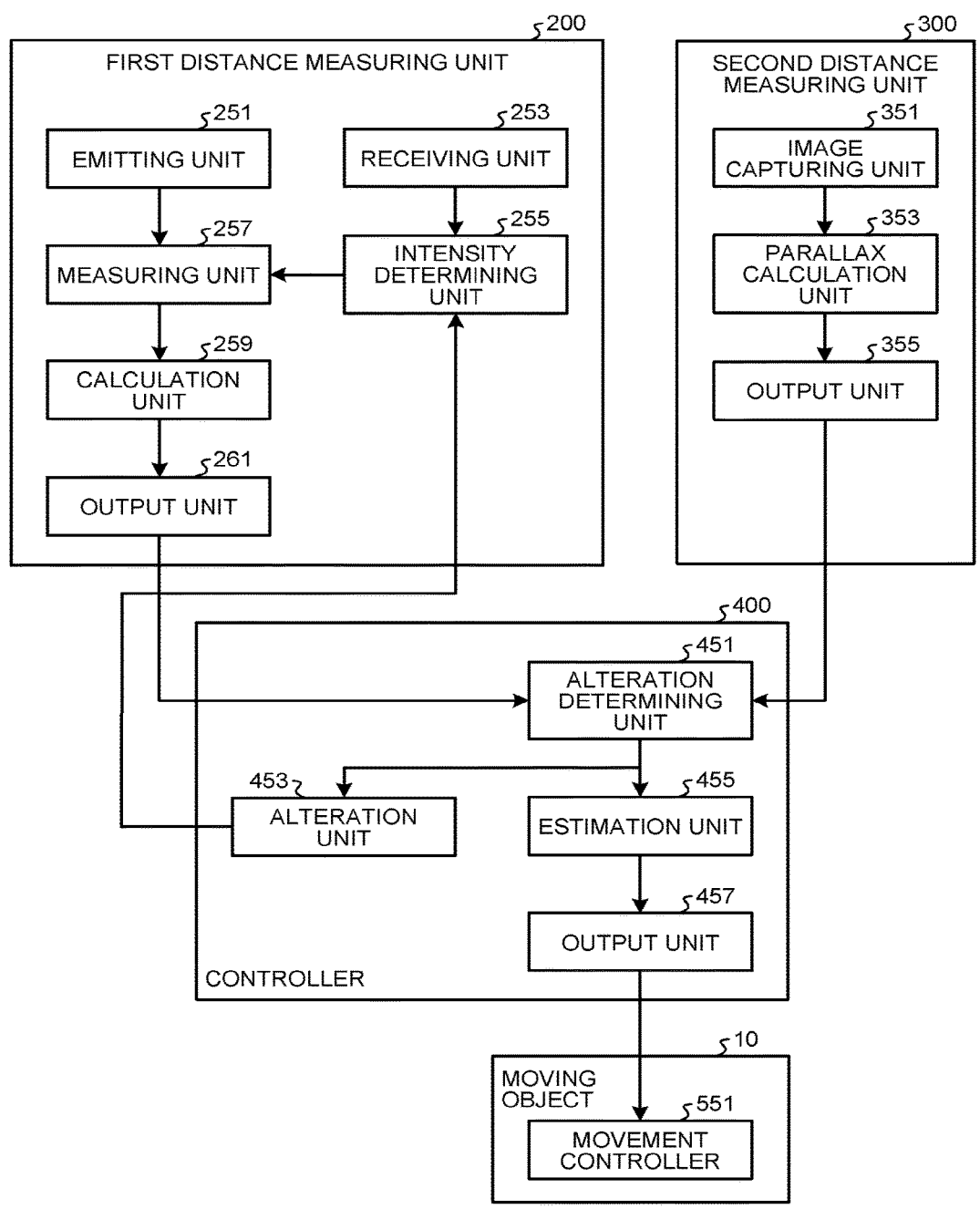
FIG. 9 is a block diagram illustrating one example of a functional configuration of the moving system in the embodiment.

FIG. 9 is a block diagram illustrating one example of the functional configuration of the moving system 1 in the embodiment. As illustrated in FIG. 9, the first distance measuring unit 200 includes an emitting unit 251, a receiving unit 253, an intensity determining unit 255, a measuring unit 257, a calculation unit 259, and an output unit 261.

The emitting unit 251 can be implemented with the light transmitting unit 210 and the ECU 230; the receiving unit 253 can be implemented with the light receiving unit 220; the intensity determining unit 255 can be implemented with the amplifier 241, the comparator 242, and the ECU 230; the measuring unit 257 can be implemented with the time measuring circuit 243; and the calculation unit 259 and the output unit 261 can be implemented with the ECU 230, for example.

Furthermore, as illustrated in FIG. 9, the second distance measuring unit 300 includes an image capturing unit 351, a parallax calculation unit 353, and an output unit 355. The image capturing unit 351 can be implemented with the imaging optical systems 121A and 121B, the CMOSs 311A and 311B, and the timing signal generator 316; and the parallax calculation unit 353 and the output unit 355 can be implemented with the CPU 315, for example.

As illustrated in FIG. 9, the controller 400 includes an alteration determining unit 451, an alteration unit 453, an estimation unit 455, and an output unit 457. The alteration determining unit 451, the alteration unit 453, the estimation unit 455, and the output unit 457 can be implemented with the CPU 411, for example.

As illustrated in FIG. 9, the moving object 10 includes a movement controller 551. The movement controller 551 can be implemented with the control calculation unit 520 and the flight controller 526, for example.

The first distance measuring unit 200 measures the distance to a target object. When the distance measurement is performed under the condition that satisfies a distance measurement condition, the first distance measuring unit 200 outputs first distance information including a value indicating the measured distance, but when the distance measurement is performed under the condition that does not satisfy the distance measurement condition, the first distance measuring unit 200 outputs the first distance information including a value indicating a predetermined value. The distance measurement performed by the first distance measuring unit 200 is the distance measurement based on an electromagnetic wave, and is performed regularly or repeatedly.

In the embodiment, exemplified is a case that the electromagnetic wave is a laser beam and the reflected wave is the reflected light of the laser beam, and that the distance measurement condition is a threshold in the intensity of the reflected light of the laser beam. However, the embodiment is not limited thereto.

The emitting unit 251 emits a laser beam to a target object. The target object can be any object as long as that is present in the periphery of the moving system 1.

The receiving unit 253 receives from the target object the reflected light of the laser beam that the emitting unit 251 emitted, and converts it to an image.

The intensity determining unit 255 determines whether the intensity of the reflected light received by the receiving unit 253 exceeds a threshold. In the embodiment, when the intensity of the reflected light exceeds the threshold, it is determined that the reflected light is not noise but the reflected light of the laser beam. However, when the reflectivity of the target object is low, the intensity may be equal to or lower than the threshold even if it is the reflected light of the laser beam, and it may be determined to be noise. In the embodiment, the threshold is set in a voltage value of the aforementioned reference voltage V0. The voltage value of the reference voltage V0 that sets the threshold may be a predetermined voltage value, or may be a voltage value set taking into consideration the distance measurement environment measured by an illuminance meter or a raindrop sensor.

The measuring unit 257, when the intensity of the reflected light received by the receiving unit 253 is determined to exceed the threshold by the intensity determining unit 255, measures the time difference (phase difference) between the laser beam that is emitted by the emitting unit 251 and the reflected light that is received by the receiving unit 253. Specifically, the measuring unit 257 measures, as the time difference, the time it takes until the reflected light is received by the receiving unit 253 after the laser beam is emitted by the emitting unit 251.

The calculation unit 259 calculates, based on the time difference measured by the measuring unit 257, the distance to the target object. Specifically, the calculation unit 259 calculates the distance to the target object by multiplying the time difference measured by the measuring unit 257 by the speed of light. The distance to the target object is to be a value greater than zero.

When the intensity of the reflected light that is received by the receiving unit 253 is determined to be equal to or lower than the threshold by the intensity determining unit 255, the calculation unit 259 makes the distance to the target object a predetermined value. In the embodiment, exemplified is a case that the predetermined value is zero. However, it is not limited thereto, and it may be any value as long as it is the value indicating that the intensity of the reflected light is equal to or lower than the threshold and that there is a possibility of noise.

The processing of the intensity determining unit 255, the measuring unit 257, and the calculation unit 259 is performed for each pixel or each pixel block constituting an image that is converted by the receiving unit 253 based on the coordinate axes and on the intensity of the reflected light at the respective coordinates. The calculation unit then associates the distance to the target object with each pixel or each pixel block constituting the image converted by the receiving unit 253 and generates a distance image as the first distance information. Thus, the distance image can represent a three-dimensional location (three-dimensional coordinates) of the target object that appears in the distance image on the three-dimensional space.

The output unit 261, when the intensity of the reflected light received by the receiving unit 253 is determined to exceed the threshold by the intensity determining unit 255, outputs the first distance information that is the distance image indicating the distance calculated by the calculation unit 259. Furthermore, in a predetermined area (relevant location), when the intensity of the reflected light that is received by the receiving unit 253 is determined to be equal to or lower than the threshold by the intensity determining unit 255, the output unit 261 outputs the first distance information that includes a predetermined value indicating an error value.

In the embodiment, it is assumed that the first distance information is a distance image. However, it is not limited thereto. For example, it may be distance information in which the distance image is converted by using a predetermined expression. In the first distance information, the pixels or the pixel blocks for which the intensity of the reflected light exceeds the threshold, out of the pixels or the pixel blocks constituting the distance image, are made to associate with the distance calculated by the calculation unit 259, while the pixels or the pixel blocks for which the intensity of the reflected light is equal to or lower than the threshold are made to associate with the predetermined value.

The second distance measuring unit 300 measures the distance to the target object and outputs second distance information indicating the distance. The distance measurement performed by the second distance measuring unit 300 is the distance measurement based on the imaging, and is performed regularly or repeatedly.

The image capturing unit 351 images a target object from each of a plurality of imaging positions. In the embodiment, the CMOS 311A and the CMOS 311B synchronously image the target object.

The parallax calculation unit 353 performs parallax calculation using a plurality of captured images obtained by the imaging of the image capturing unit 351, and generates the aforementioned parallax image. Specifically, the parallax calculation unit 353 calculates the parallax by performing block matching on the same portion of stereo images obtained by the imaging of the image capturing unit 351, and generates the parallax image.

For example, the parallax calculation unit 353 defines either the left image or the right image constituting the stereo images as a reference image. When the left image is defined as the reference image, the parallax calculation unit 353 divides the left image to blocks centering a pixel of interest and calculates the sum of the difference in luminance value for each pixel with the block of the same location of the right image. At this time, the parallax calculation unit 353 repeatedly calculates the sum of the difference in luminance value for each pixel while shifting the block in the horizontal direction by one pixel at a time on the right image. Then, the parallax calculation unit 353 makes the amount of movement of the block the parallax when the sum of the difference in luminance value between the blocks of the left image and the right image is the smallest. For example, when the sum of the difference in luminance value between the block centering the pixel (x, y) of the left image and the block centering the pixel (x+Δ, y) of the right image is the smallest, the parallax is Δ. When it is defined that the distance to an object S from the lens is Z, the distance (base length) between the centers of the left and right lenses is D, the focal length is f, and the parallax is Δ, the distance Z is expressed as follows:

$$Z = D \cdot f / \Delta$$

In the embodiment, exemplified is a case in which the parallax information that is associated with the parallax image in units of pixels or pixel blocks is the distance to the target object. However, the parallax information is not limited thereto, and it may be parallax.

The output unit 355, when the parallax calculation unit 353 succeeded in parallax calculation, outputs a parallax image obtained by the parallax calculation as the second distance information indicating the distance to the target object. The output unit 355, when the parallax calculation unit 353 failed in parallax calculation, outputs the second distance information including the predetermined value indicating the error value. In the embodiment, exemplified is a case that the predetermined value is zero. However, it is not limited thereto as long as it is the value indicating the error value.

In the embodiment, it is assumed that the second distance information is a parallax image. However, it is not limited thereto. For example, it may be the distance information in which the parallax image is converted by using a predetermined expression. In the second distance information, the pixels or the pixel blocks for which the parallax calculation was successful, out of the pixels or the pixel blocks constituting the parallax image, are made to associate with the obtained parallax information. The pixels or the pixel blocks for which the parallax calculation was failed are made to associate with the predetermined value.

The alteration determining unit 451 determines whether the first distance information on a predetermined area output by the first distance measuring unit 200 indicates the predetermined value, and whether the second distance information on the corresponding area corresponding to the above-described predetermined area output by the second distance measuring unit 300 satisfies a predetermined condition. In the embodiment, exemplified is a case in which the predetermined condition is that the second distance information indicates the distance to the target object that was obtained by the parallax calculation, that is, the second distance information indicates a value greater than zero. However, it is not limited thereto.

In this case, the alteration determining unit 451 determines whether the first distance information in the predetermined area indicates zero, and whether the second distance information in the corresponding area corresponding to the predetermined area indicates a value greater than zero. In more detail, the alteration determining unit 451 determines, at an identical location on the first distance information (distance image) and the second distance information (parallax image), whether the first distance information indicates zero, and whether the second distance information indicates a value greater than zero.

In the embodiment, as in the foregoing, the reference axis of the laser distance measuring device (the first distance measuring unit 200) and the reference axis of the stereo camera (the second distance measuring unit 300) are the identical axis, and the light receiving surface of the laser distance measuring device (the first distance measuring unit 200) and the imaging surface of the stereo camera (the second distance measuring unit 300) are located on the identical axis. Thus, the coordinate axes of the three-dimensional space indicated by the first distance information (distance image) and the coordinate axes of the three-dimensional space indicated by the second distance information (parallax image) match up; and by considering a predetermined measurement area of the laser distance measuring device and the measurement area of the stereo camera, an identical location (three-dimensional position) in both three-dimensional space can be derived easily without performing coordinate transformation. Moreover, not only the coincidence in the coordinate axes, if the projection method in generating an image from the first distance information and the projection method in generating an image from the second distance information are identical, it makes the calculation of an identical location in both three-dimensional space further easy.

The alteration unit 453, when the alteration determining unit 451 determined that the first distance information in a predetermined area indicates the predetermined value and the second distance information in the area corresponding to the predetermined area satisfies the predetermined condition, makes alteration such that the distance measurement condition of the first distance measuring unit 200 is relaxed. Specifically, when the alteration determining unit 451 determined, at an identical location indicated by the first distance information (distance image) and indicated by the second distance information (parallax image), that the first distance information indicates zero and the second distance information indicates a value greater than zero, the alteration unit 453 lowers the threshold of the first distance measuring unit 200.

For example, the alteration unit 453 gives instructions to the first distance measuring unit 200 to lower the threshold. The intensity determining unit 255 receives the instructions of the controller 400 and lowers the threshold (decreases the voltage value of the reference voltage V0). In the embodiment, exemplified is a case that the threshold is lowered by a predetermined value. However, the method of lowering the threshold is not limited thereto.

Thus, when subsequent distance measurement is performed, the first distance measuring unit 200 is to measure the distance to the target object again under the altered distance measurement condition. When the distance measurement is performed again, the first distance measuring unit 200 may measure distance again only for the locations for which it was not possible to measure the distance the previous time (locations for which the first distance information indicated zero). Furthermore, the first distance measuring unit 200 may alter the distance measurement condition and measure distance again only when the location for which it was not possible to measure the distance is of a predetermined size (the number of pixels).

The estimation unit 455 generates self-location estimating information by using the first distance information output by the first distance measuring unit 200, and the second distance information output by the second distance measuring unit 300. The self-location estimating information is the distance information calculated from the first distance information and the second distance information by weighting. The weighting is determined as desired in accordance with the performance required by designers, from the differences in accuracy, distance measurement condition, and others between the first distance measuring unit 200 and the second distance measuring unit 300. The estimation unit 455 further performs the self-location estimation by using the self-location estimating information and calculates the self-location estimated result. The self-location estimation may be performed by using a known technology such as simultaneous localization and mapping (SLAM), for example. The self-location estimated result is the positional information on itself in a map. In the self-location estimation using the self-location estimating information including a plurality of frames, the self-location estimated result is the moving speed, acceleration, and others. The self-location estimated result may also include positional information on an obstacle in the measuring direction.

When the first distance information indicates the error value of zero in a predetermined area and the second distance information in the area corresponding to the predetermined area indicates the error value of zero, the estimation unit 455 sets a predetermined value that indicates an error value (for example, zero) to the predetermined area in the self-location estimating information. In the area that indicates the predetermined value in the self-location estimating information, the estimation unit 455 does not use it for the self-location estimation. Thus, the error value can be suppressed from being reflected in the estimation of the self-location.

The output unit 457 outputs the self-location estimated result estimated by the estimation unit 455 to the moving object 10.

The movement controller 551 controls, based on the self-location estimated result output from the distance measuring device 100, the movement of the moving object 10 (moving system 1).

Figure 10:
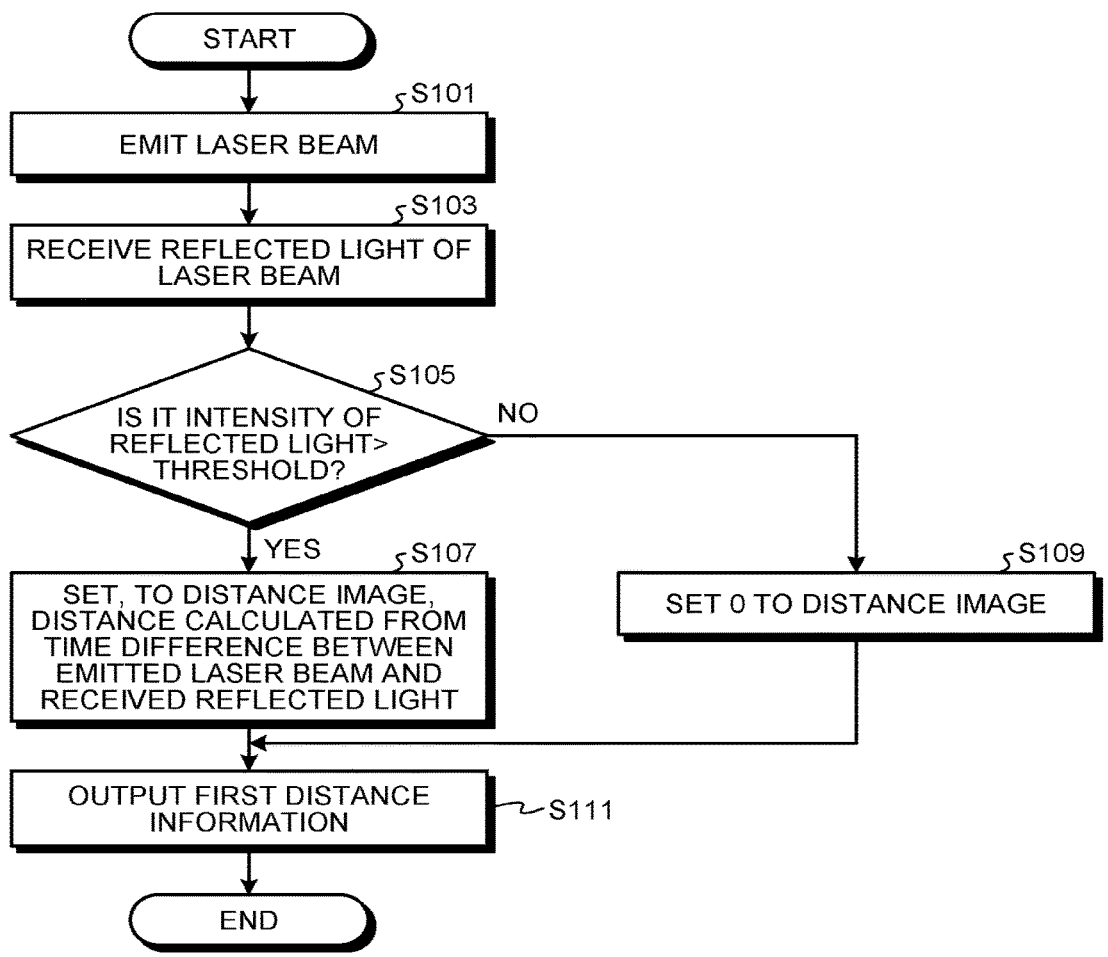
FIG. 10 is a flowchart illustrating one example of procedures of processing performed by the first distance measuring unit in the embodiment.

FIG. 10 is a flowchart illustrating one example of procedures of the processing performed by the first distance measuring unit 200 in the embodiment. The processing illustrated in FIG. 10 is performed regularly or repeatedly.

First, the emitting unit 251 emits a laser beam to a target object (Step S101).

Subsequently, the receiving unit 253 receives from the target object the reflected light of the laser beam that the emitting unit 251 emitted, and converts it to an image (Step S103).

The intensity determining unit 255 then determines whether the intensity of the reflected light received by the receiving unit 253 exceeds a threshold (Step S105).

If the intensity of the reflected light received by the receiving unit 253 is determined to exceed the threshold by the intensity determining unit 255 (Yes at Step S105), the measuring unit 257 measures the time difference between the laser beam emitted by the emitting unit 251 and the reflected light received by the receiving unit 253. The calculation unit 259 calculates, based on the time difference measured by the measuring unit 257, the distance to the target object, and sets the calculated distance to the distance image that is the image converted by the receiving unit 253 (Step S107).

If the intensity of the reflected light received by the receiving unit 253 is determined to be equal to or lower than the threshold by the intensity determining unit 255 (No at Step S105), the calculation unit 259 sets zero to the distance image that is the image converted by the receiving unit 253 (Step S109).

The processing from Step S105 to Step S109 is performed on each pixel or each pixel block constituting the distance image.

Subsequently, the output unit 261 outputs to the controller 400, as the first distance information, the distance image for which the distance for each pixel or each pixel block is set (Step S111).

Figure 11:
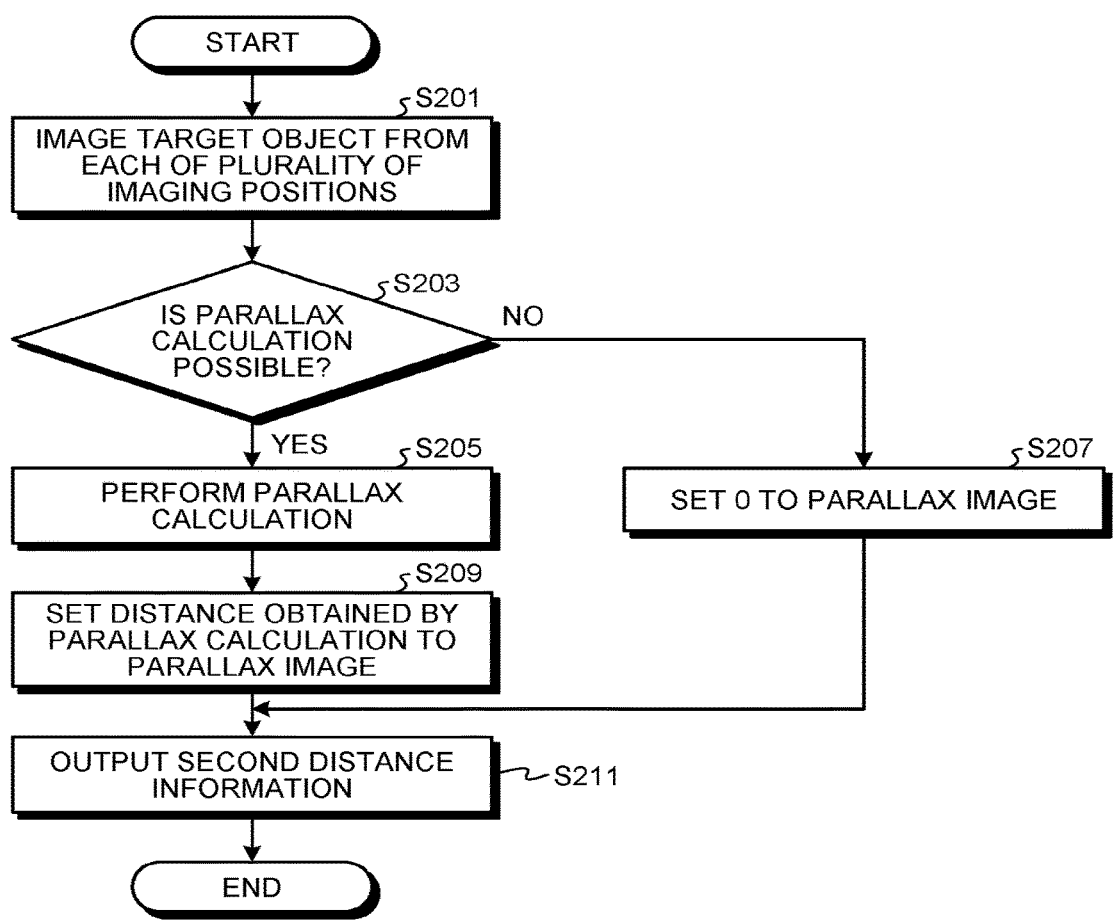
FIG. 11 is a flowchart illustrating one example of procedures of processing performed by the second distance measuring unit in the embodiment.

FIG. 11 is a flowchart illustrating one example of procedures of the processing performed by the second distance measuring unit 300 in the embodiment. The processing illustrated in FIG. 11 is performed regularly or repeatedly.

First, the image capturing unit 351 images the target object from each of a plurality of imaging positions (Step S201).

Subsequently, if the parallax calculation using a plurality of captured images obtained by the imaging of the image capturing unit 351 is possible (Yes at Step S203), the parallax calculation unit 353 obtains the parallax and distance by performing the parallax calculation (Step S205), and sets the calculated distance to the parallax image as the parallax information (Step S209).

If the parallax calculation using a plurality of captured images obtained by the imaging of the image capturing unit 351 is not possible (No at Step S203), the parallax calculation unit 353 sets zero to the parallax image (Step S207).

The processing from Step S203 to Step S209 is performed on each pixel or each pixel block constituting the distance image.

Subsequently, the output unit 355 outputs to the controller 400, as the second distance information, the parallax image for which the distance for each pixel or each pixel block is set (Step S211).

Figure 12:
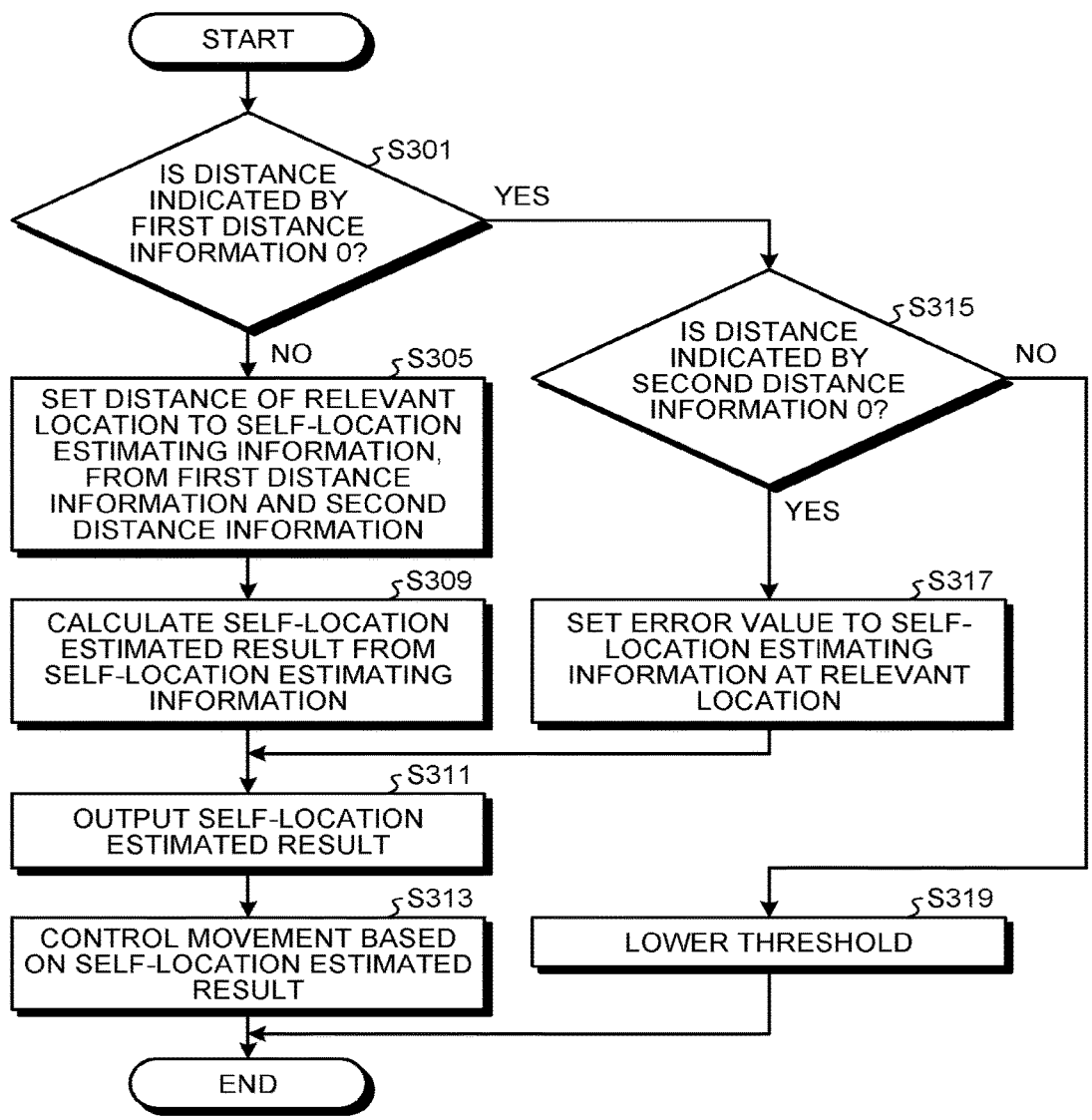
FIG. 12 is a flowchart illustrating one example of procedures of processing performed by the controller in the embodiment.

FIG. 12 is a flowchart illustrating one example of procedures of the processing performed by the controller 400 in the embodiment. The processing illustrated in FIG. 12 is performed regularly or repeatedly.

First, the alteration determining unit 451 determines whether the distance at any of the locations that is indicated by the first distance information (distance image) is zero (Step S301).

If the distance at any of the locations indicated by the first distance information is zero (Yes at Step S301), the alteration determining unit 451 determines whether the distance indicated by the second distance information (parallax image) at the location identical to the location at which the distance in the first distance information is zero is zero (Step S315).

If the distance indicated by the second distance information in the identical location (relevant location) is not zero (of a value greater than zero) (No at Step S315), the alteration unit 453 gives instructions to the first distance measuring unit 200 to lower the threshold, and the first distance measuring unit 200 (the intensity determining unit 255) receives the instructions of the controller 400 and lowers the threshold (Step S319).

If the distance indicated by the second distance information is zero (Yes at Step S315), the estimation unit 455 sets an error value, at the relevant location, to the self-location estimating information that is the distance information for estimating the self-location generated from the first distance information and the second distance information (Step S317).

If the distance at any of the locations indicated by the first distance information is not zero (of a value greater than zero) (No at Step S301), the estimation unit 455 determines the distance to the target object by weighting at the relevant location, and sets the determined distance to the self-location estimating information generated from the first distance information and the second distance information (Step S305).

Then, the estimation unit 455 generates the self-location estimating information for which the distance information or the error value is set for each pixel (each location), and calculates the self-location estimated result from the self-location estimating information (Step S309). For example, the estimation unit 455 generates the self-location estimation information by using the first distance information for the distance within the field of view of the first distance measuring unit 200 and by using the second distance information for the distance outside the field of view of the first distance measuring unit 200. Moreover, in the field of view common to the first distance measuring unit 200 and the second distance measuring unit 300, the estimation unit 455 uses the value set at Step S305 or Step S317. From the self-location estimation information generated by the foregoing, the estimation unit 455 estimates the self-location by using SLAM and others, and calculates the self-location estimated result.

The output unit 457 then outputs the self-location estimated result to the moving object 10 (Step S311).

Then, the movement controller 551 controls, based on the self-location estimated result output from the distance measuring device 100, the movement of the moving object 10 (moving system 1) (Step S313).

For example, if the movement controller 551 determines, from the self-location estimation information, that there is no obstacle present in the advancing direction, the movement controller 551 performs control to cause the moving object 10 to move in the advancing direction. Furthermore, if the movement controller 551 determines, from the self-location estimation information, that there is an obstacle present in the advancing direction, the movement controller 551 performs control to cause the moving object 10 to move so as to detour the obstacle, for example. If the self-location estimation information is of the error value, the movement controller 551 performs control to cause the moving object 10 not to move into the space in which the distance measurement was performed or control to cause the moving object 10 to stand still, for example.

Even after the threshold is lowered at Step S319, if it remains that the distance indicated by the first distance information is zero (Yes at Step S301) and the distance indicated by the second distance information is not zero (No at Step S315) at the identical location, the estimation unit 455 may estimate the self-location by using the second distance information.

At Step S309 in FIG. 12, the estimation unit 455 does not use the area that indicates the error value for the estimation of the self-location, or makes the effect thereof small by weighting. Thus, the error value can be suppressed from being reflected in the estimation of the self-location. In regard to the location in the predetermined area in which the value of the first distance information is zero and the value of the second distance information is not zero, when the value of the first distance information is still zero even when measured again by lowering the threshold at Step S319, the self-location estimating information may be generated by using the value of the second distance information.

In the embodiment, as in the foregoing, because the coordinate axes of the three-dimensional space indicated by the first distance information (distance image) and the coordinate axes of the three-dimensional space indicate by the second distance information (parallax image) match up, in this case (the distance information used for the self-location estimation is switched to the second distance information) also, the estimation of the self-location can be continued without performing the coordinate transformation and others. The coordinate axes are made to match in the embodiment. However, the processing to make the coordinate axes match may be added in the course of the processing of estimating the self-location.

As in the foregoing, according to the present embodiment, the situation in which the distance measurement is possible can be extended. In the embodiment, the value of zero is set to the parallax image if the parallax calculation is not possible. However, the value to set when not possible can be defined to any as desired by the designers.

Specifically, according to the embodiment, when the distance in the distance measurement by the first distance measuring unit 200 is zero because the intensity of the reflected light is below the threshold while the distance in the distance measurement by the second distance measuring unit 300 is greater than zero because the distance measurement is possible, the distance measurement is performed again by lowering the threshold.

That is, according to the embodiment, the location that the distance in the distance measurement by the first distance measuring unit 200 is zero and that the distance in the distance measurement by the second distance measuring unit 300 is greater than zero is assumed to be a location on a target object of low reflectivity, and the distance measurement is performed again by lowering the threshold for the intensity of the reflected light.

As in the foregoing, according to the embodiment, it is determined whether the reflectivity of the location on the target object is low by using the distance measurement result by the second distance measuring unit 300 and, when the reflectivity is low, the distance measurement is performed again by lowering the threshold. Thus, even in a condition that the distance measurement by the first distance measuring unit 200 alone is not possible, the distance can be measured and the situation in which the distance measurement is possible can be extended.

In general, the distance measurement by a laser distance measuring device is higher in accuracy than the distance measurement by a stereo camera. Thus, according to the embodiment, the situation of performing the self-location estimation by using the distance measurement result by the first distance measuring unit 200 (laser distance measuring device) can be extended, and the accuracy in movement of the moving object can also be improved.

First Modification

In the present embodiment, by using the distance measurement result by the second distance measuring unit 300 (stereo camera), it has been exemplified that the situation in which the distance measurement by the first distance measuring unit 200 (laser distance measuring device) is possible is extended. However, the embodiment is not limited thereto, and by using the distance measurement result by the first distance measuring unit 200 (laser distance measuring device), a situation that the distance measurement by the second distance measuring unit 300 (stereo camera) is possible may be extended.

Second Modification

Figure 13:
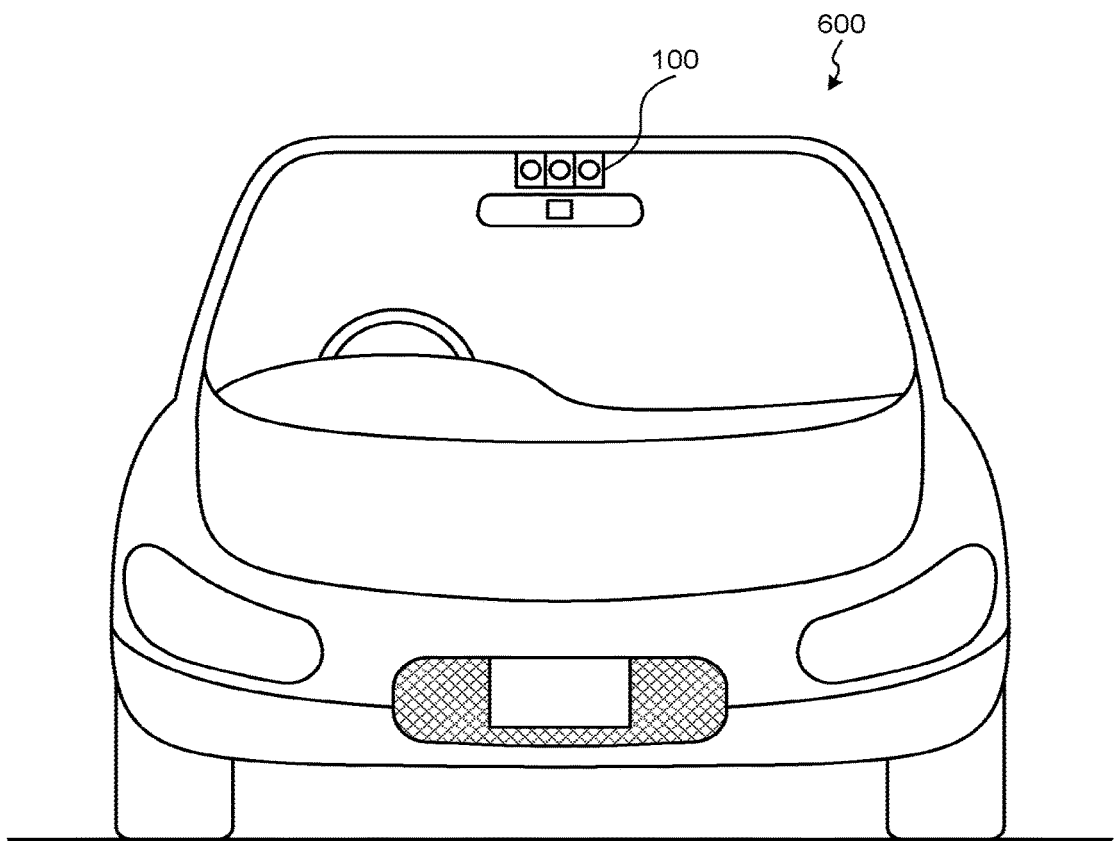
FIG. 13 is a schematic diagram illustrating one example of a moving system according to a second modification.

In the above-described embodiment, it has been exemplified that the moving object 10 is a moving object that moves autonomously, that the distance measuring device 100 estimates the self-location of the moving object 10 by measuring the distance to an object (target object) present in the periphery of the moving object, and that the moving object 10 controls the autonomous locomotion based on the self-location estimated result of the distance measuring device 100. However, the embodiment is not limited thereto. For example, as illustrated in FIG. 13, the moving object may be an automobile 600, and the distance measuring device 100 may be provided at a position in which the distance to an object (target object) present in the moving direction of the automobile 600 can be measured. In this case, the distance measuring device 100 measures the distance to an object (target object) present in the moving direction of the automobile 600 to detect an obstacle and others that is present on the course of the automobile 600, and the automobile can, by using a display and a speaker provided on the automobile, inform the driver of the obstacle and others detected by the distance measuring device. In this case, the estimation unit 455 of the distance measuring device 100 does not need to perform the self-location estimation by using at least one of the first distance information and the second distance information, and only needs to determine the distance to the target object by using at least one of the first distance information and the second distance information.

Third Modification

In the above-described embodiment, exemplified has been a case that the laser distance measuring device performs the distance measurement by a scanning method. Alternatively, the distance measurement may be performed by a non-scanning method. Still alternatively, in the scanning method, the optical system that emits a laser beam and the optical system that receives the reflected light of the laser beam may be used in common. For example, in a distance measuring device 700 in the example illustrated in FIG. 14, an attachment 710 has a built-in laser distance measuring device that performs distance measurement in a scanning method, and an optical system that emits a laser beam and an optical system that receives the reflected light of the laser beam are used in common as an optical system 711.

Figure 14:
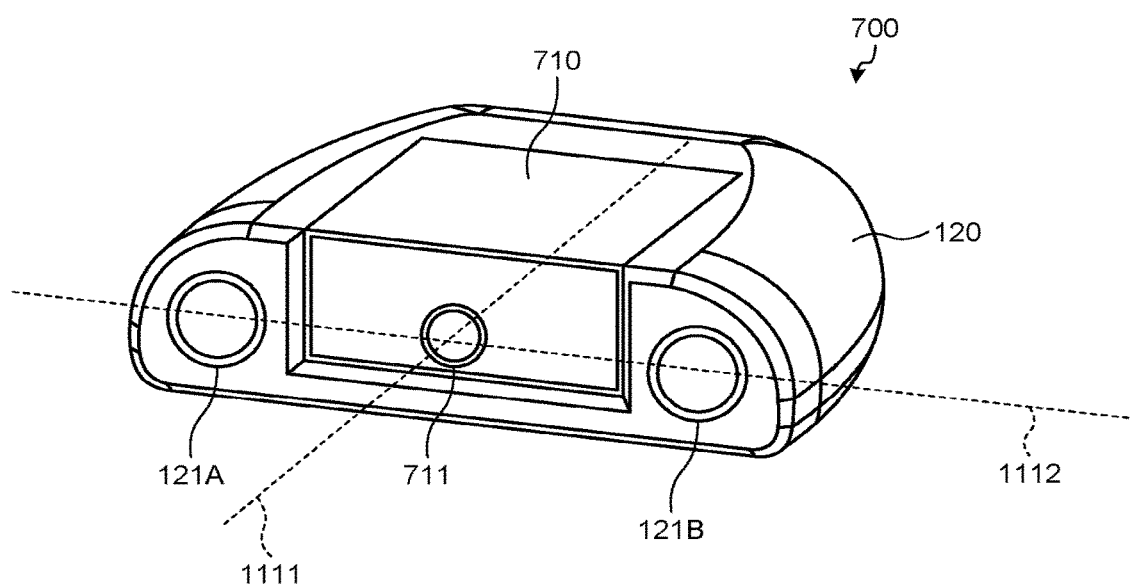
FIG. 14 is a perspective view illustrating one example of a distance measuring device according to a third modification.

In also the example illustrated in FIG. 14, in order to make the coordinate axes of the three-dimensional space measured by the distance measurement by the laser distance measuring device and the coordinate axes of three-dimensional space measured by the distance measurement by the stereo camera coincide, the distance measuring device 700 is designed such that the reference axis of the laser distance measuring device and the reference axis of the stereo camera are an identical axis 1111 and such that the light receiving surface of the laser distance measuring device and the imaging surface of the stereo camera are located on an identical axis 1112.

The laser distance measuring device that performs distance measurement in a non-scanning method has an advantage in that the frame rate can be reduced, and the laser distance measuring device that performs distance measurement in a scanning method has an advantage in that the distance measurement of a long distance is possible because the laser beam is emitted being condensed.

Fourth Modification

In the above-described embodiment, the distance has been used as the second distance information. However, whether to lower the threshold may be determined by further using a color image (color of a target object) imaged by the second distance measuring unit 300. In this case, the output unit 355 of the second distance measuring unit 300 outputs a predetermined color image based on a plurality of captured images (color images) obtained by imaging of the image capturing unit 351.

The predetermined color image may be any of the color images, or may be a combined color image in which the color images are combined into one color image. As for the combination of the color images, the processing may be performed by using a predetermined setting, or the processing may be performed from the result of the matching processing of the parallax image. Furthermore, when combining the color images, as for the pixels the imaging areas of which are in common, the average value of the relevant pixels only needs to be used. The generation of a combined color image only needs to be performed by the CPU 315 of the second distance measuring unit 300.

Then, with respect to the area on the target object for which the first distance information indicates a predetermined value, when it is determined by the alteration determining unit 451 that the second distance information indicates the distance obtained by the parallax calculation and that the color of a corresponding area on a predetermined color image corresponding to the relevant area indicates a predetermined color, the alteration unit 453 may lower the threshold of the first distance measuring unit 200. That is, the alteration determining unit 451 determines, at an identical location indicated by the first distance information (distance image) and the second distance information (parallax image), whether the first distance information indicates zero, whether the second distance information indicates a value greater than zero, and whether the predetermined color image indicates the predetermined color. When the first distance information indicates zero, when the second distance information indicates a value greater than zero and the predetermined color image indicates the predetermined color, the alteration unit 453 may lower the threshold of the first distance measuring unit 200.

Examples of the predetermined color include at least one of black and a skin color. This is because the black tends to absorb an electromagnetic wave (laser beam) and has low reflectivity, and there may be a case that, when the electromagnetic wave is reflected on a black area on a target object, the reflected wave (reflected light) is low in intensity and is erroneously determined to be noise. Furthermore, this is because the area of the skin color on the target object is highly likely to be the skin of human, the human also has low reflectivity, and there may be a case also that, when the electromagnetic wave is reflected on a skin colored area on a target object (a human), the reflected wave (reflected light) is low in intensity and is erroneously determined to be noise. Accordingly, on the areas in black and in skin color on the target object also, if the processing is performed as in the foregoing, the distance measurement with the laser distance measuring device by the first distance measuring unit 200 is made possible.

Figure 15:
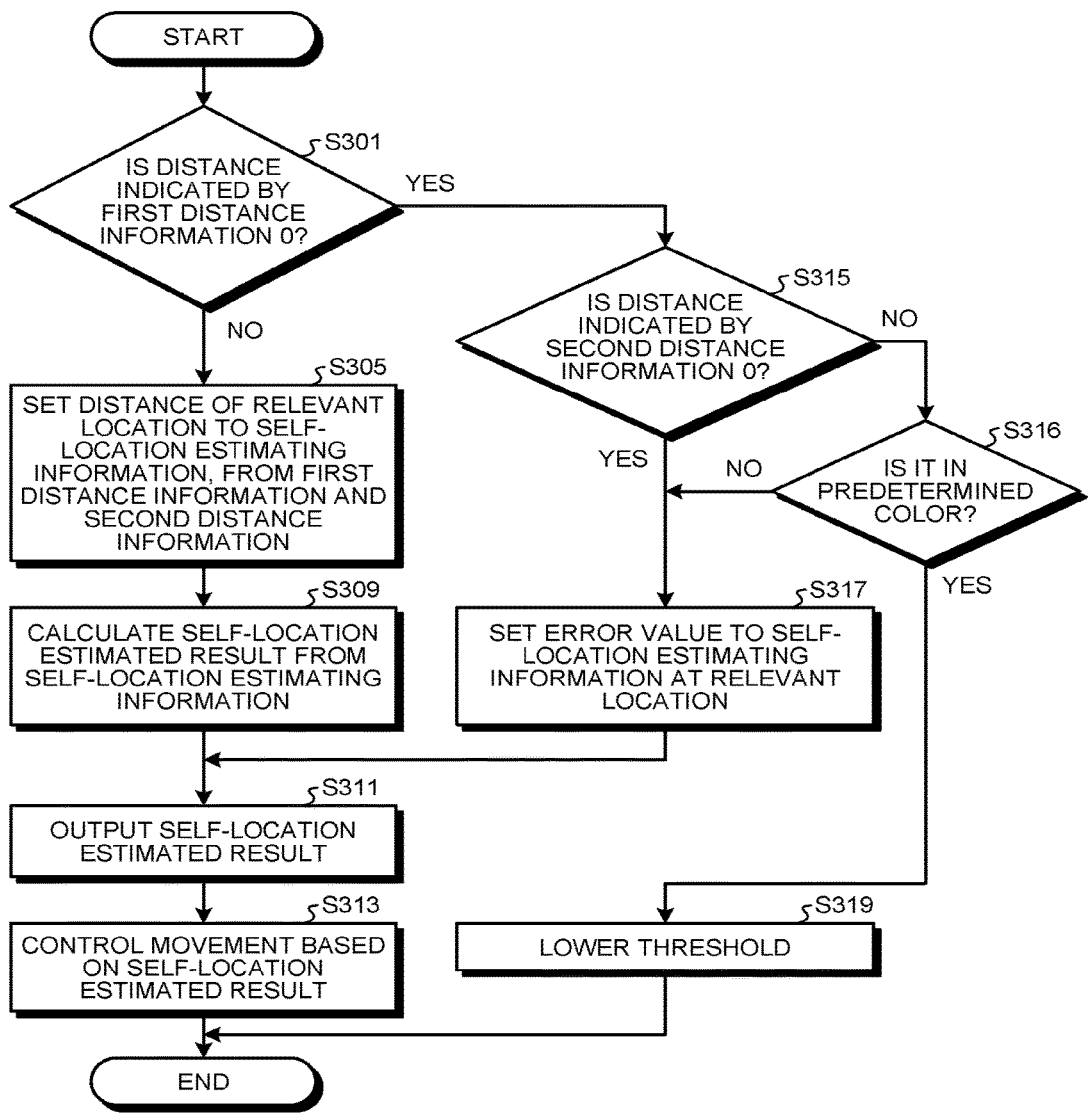
FIG. 15 is a flowchart illustrating one example of procedures of processing performed by a controller according to a fourth modification.

FIG. 15 is a flowchart illustrating one example of procedures of the processing performed by the controller 400 according to a fourth modification. The processing illustrated in FIG. 15 is the same as that illustrated in FIG. 12, except for Step S316. At Step S316, the alteration determining unit 451 determines, by using the predetermined color image, whether the color at the location for which the distance in the first distance information is zero and the distance in the second distance information is greater than zero, is in the predetermined color. If it is Yes at Step S316, the alteration unit 453 gives instructions to the first distance measuring unit 200 to lower the threshold, and the first distance measuring unit 200 (the intensity determining unit 255) receives the instructions of the controller 400 and lowers the threshold (Step S319). If it is No at Step S316, the estimation unit 455 sets the error value, at the relevant location, to the self-location estimating information (Step S317). By the foregoing steps, for the area in which the first distance measuring unit 200 was not able to perform the distance measurement and the second distance measuring unit 300 was able to perform the distance measurement, the distance measurement condition of the first distance measuring unit 200 is altered by using the color image of the second distance measuring unit 300 so as to be able to pick up more signals, and a situation in which the distance measurement is possible can thereby be extended.

As the same as the example that is illustrated in FIG. 12, at Step S309, the estimation unit 455 does not use the area that indicates the error value for the estimation of the self-location, or makes the effect thereof small by weighting. Thus, the error value can be suppressed from being reflected in the estimation of the self-location. In regard to the location in the predetermined area in which the value of the first distance information is zero and the value of the second distance information is not zero, when the value of the first distance information is still zero even when measured again by lowering the threshold at Step S319, the self-location estimating information may be generated by using the value of the second distance information.

Fifth Modification

In the fourth modification, the alteration unit 453 may be configured to lower the threshold of the first distance measuring unit 200 in accordance with the luminance value of the corresponding area on the predetermined color image and with the exposure time required for imaging the target object. Specifically, in the distance measurement with the laser distance measuring device by the first distance measuring unit 200, when the distance measurement is performed in a brighter environment, extra light is received and noise is more likely to be generated, and when performed in a darker environment, the noise is less likely to be generated. Accordingly, the alteration unit 453 may be configured such that the amount of lowering in the threshold is increased more as the luminance value of the corresponding area on the predetermined color image is smaller, and such that the amount of decrease in the threshold is increased more as the time required for imaging by the second distance measuring unit 300 is longer. Thus, a situation in which the distance measurement is possible can be extended more as the noise is less.

Sixth Modification

In the above-described embodiment and modifications, when the alteration determining unit 451 determines that the value (distance) the second distance information indicates is not only greater than zero but is greater than a predetermined distance, the alteration unit 453 may be configured to decrease the threshold of the first distance measuring unit 200. Accordingly, the distance measurement result (second distance information) of the second distance measuring unit 300 can be used in the distance measurement of a near distance, and the distance re-measurement result (first distance information) of the first distance measuring unit 200 that is capable of measuring in high accuracy can be used in the distance measurement of a long distance.

Seventh Modification

The above-described embodiment and modifications may be configured such that the alteration unit 453 not only decreases the threshold of the first distance measuring unit 200 but also increases the number of times to perform the distance measurement of the first distance measuring unit 200. In this case, the first distance measuring unit 200 performs the distance measurement of the target object the increased number of times and the alteration unit 453 determines the first distance information based on the distance measurement results for the increased number of times. When the threshold of the first distance measuring unit 200 is lowered, the noise may be erroneously recognized as the reflected wave. However, the distance measurement is performed a plurality of times (the increased number of times) to allow the elimination of the noise. For example, out of a plurality of rays of reflected light (including a case of noise) obtained by a plurality of distance measurements, the distance is calculated by removing the reflected light for which the intensity is of an outlier (the intensity for which the difference from other intensities is great) even when the intensity exceeds the threshold to allow the noise to be eliminated, and thus the accuracy in distance measurement result to be prevented from deteriorating. Furthermore, for example, out of a plurality of rays of reflected light (including a case of noise) obtained by a plurality of distance measurements, the distance is calculated by removing the reflected light for which the time difference (the time difference between the time when the laser beam is emitted and the time when the reflected light is received) is of an outlier even when the intensity exceeds the threshold to allow the noise to be eliminated, and thus the accuracy in distance measurement result to be prevented from deteriorating.

The present invention provides the advantageous effect of extending a situation in which the distance measurement is possible.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A distance measuring device, comprising:
   a first distance measurer configured to
      measure a distance to a target object, and
      output first distance information indicating a measured distance when the distance measurement is performed under a condition that satisfies a distance measurement condition, but output the first distance information indicating a predetermined value when the distance measurement is performed under a condition that does not satisfy the distance measurement condition;
   a second distance measurer that measures a distance to the target object and outputs second distance information indicating the measured distance; and
   circuitry configured to, when the first distance information indicates the predetermined value and, at a same time, the second distance information satisfies a predetermined condition, make an alteration such that the distance measurement condition used by the first distance measurer is altered, wherein
   when the distance measurement condition is altered, the circuitry is further configured to cause the first distance measurer to measure a distance to the target object again.

2. The distance measuring device according to claim 1, wherein
   the first distance measurer is further configured to perform distance measurement based on an electromagnetic wave, and
   the second distance measurer is further configured to perform distance measurement based on imaging.

3. The distance measuring device according to claim 2, wherein
   the distance measurement condition is a threshold,
   the first distance measurer is further configured to
      emit an electromagnetic wave to the target object and receive a reflected wave of the emitted electromagnetic wave from the target object, and
      calculate the distance to the target object based on a time difference between the emitted electromagnetic wave and the received reflected wave when intensity of the received reflected wave exceeds the threshold to output the first distance information indicating the calculated distance, but output the first distance information indicating the predetermined value when the intensity of the received reflected wave is equal to or lower than the threshold,
   the second distance measurer is further configured to
      image the target object from each of a plurality of imaging positions,
      perform parallax calculation on a plurality of color images obtained by imaging, and
      output, when the parallax calculation is successful, the second distance information indicating the distance to the target object obtained by the parallax calculation, and a predetermined color image that is based on the color images, and
   the circuitry is further configured to lower the threshold when, with respect to an area on the target object for which the first distance information indicates the predetermined value, the second distance information indicates the distance obtained by the parallax calculation and a color of a corresponding area on the predetermined color image corresponding to the area on the target object indicates a predetermined color.

4. The distance measuring device according to claim 3, wherein
   a value of the distance to the target object is greater than zero,
   the predetermined value is zero,
   the predetermined color is at least one of black and a skin color, and
   the circuitry is further configured to lower the threshold when, with respect to the area on the target object for which the first distance information indicates zero, the second distance information indicates a value greater than zero and the color of the corresponding area indicates at least one of black and a skin color.

5. The distance measuring device according to claim 3, wherein the circuitry is further configured to lower the threshold when, with respect to the area on the target object for which the first distance information indicates the certain value is equal to or greater than a predetermined distance, the distance indicated by the second distance information and obtained by the parallax calculation is equal to or greater than a predetermined distance.

6. The distance measuring device according to claim 3, wherein the circuitry is further configured to lower the threshold by a predetermined value.

7. The distance measuring device according to claim 3, wherein the circuitry is further configured to lower the threshold in accordance with a luminance value of the corresponding area.

8. The distance measuring device according to claim 3, wherein the circuitry is further configured to lower the threshold in accordance with an exposure time required for imaging the target object.

9. The distance measuring device according to claim 1, wherein
the circuitry is further configured to increase a number of times of distance measurement of the first distance measurer, and
the first distance measurer is further configured to perform distance measurement of the target object the increased number of times, and determine the first distance information based on distance measurement results for the increased number of times.

10. A moving system comprising:
the distance measuring device according to claim 1; and
a moving object.

11. A distance measurement method, comprising:
measuring a distance to a target object;
outputting first distance information indicating a measured distance when the distance measurement is performed under a condition that satisfies a distance measurement condition, but outputting the first distance information indicating a predetermined value when the distance measurement is performed under a condition that does not satisfy the distance measurement condition;
measuring a distance to the target object and outputting second distance information indicating the measured distance;
making, when the first distance information indicates the predetermined value and the second distance information satisfies a predetermined condition, an alteration such that the distance measurement condition is altered; and
measuring a distance to the target object again when the distance measurement condition is altered.

12. The distance measuring device of claim 1, wherein the first distance measurer includes a sensor and is further configured to output the predetermined value when an output of the sensor is less than or equal to a predetermined threshold.

13. The distance measuring device of claim 1, wherein the circuitry is further configured to make the alteration when the second distance information is a distance that is greater than zero and, at the same time, the first distance information equals the predetermined value.

* * * * *